April 22, 1930.  H. SONNENBERG  1,755,374
MOLDING MACHINE
Filed Aug. 10, 1927   2 Sheets-Sheet 1
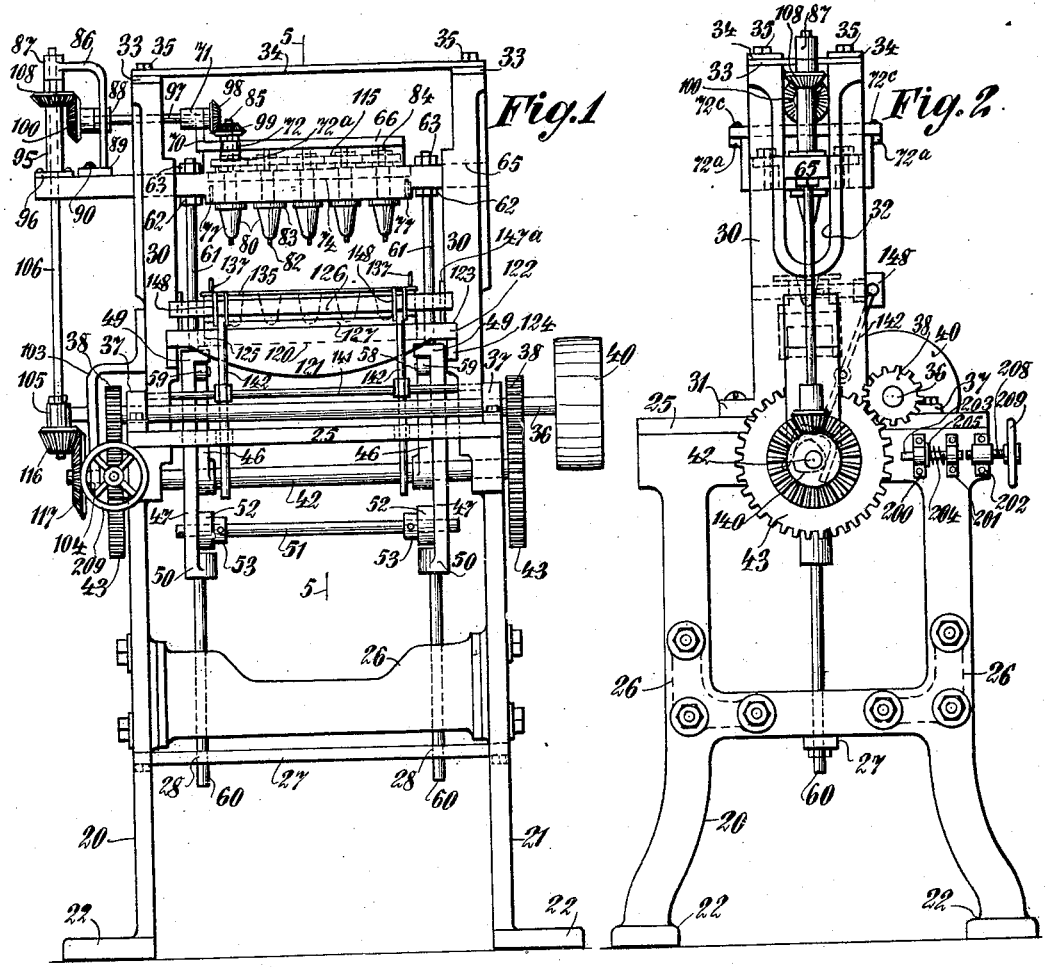
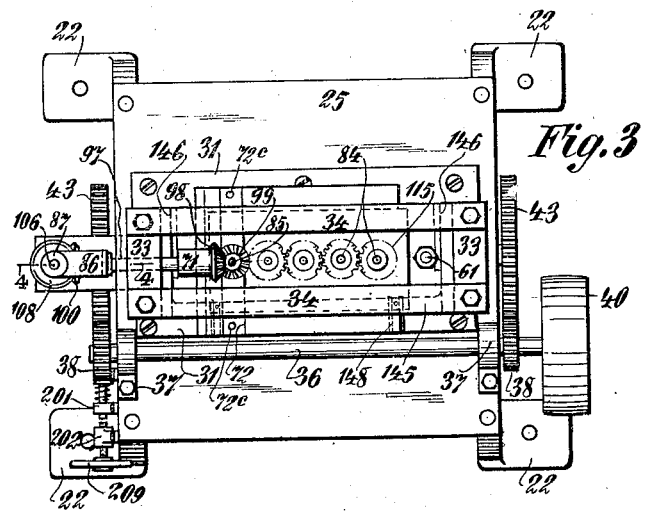
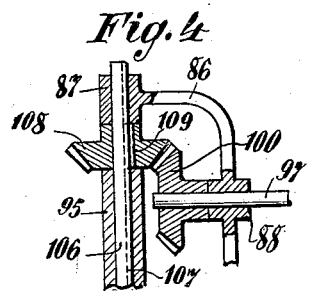
INVENTOR
*Herman Sonnenberg*,
BY
*A. Ade Bonneville*
ATTORNEY

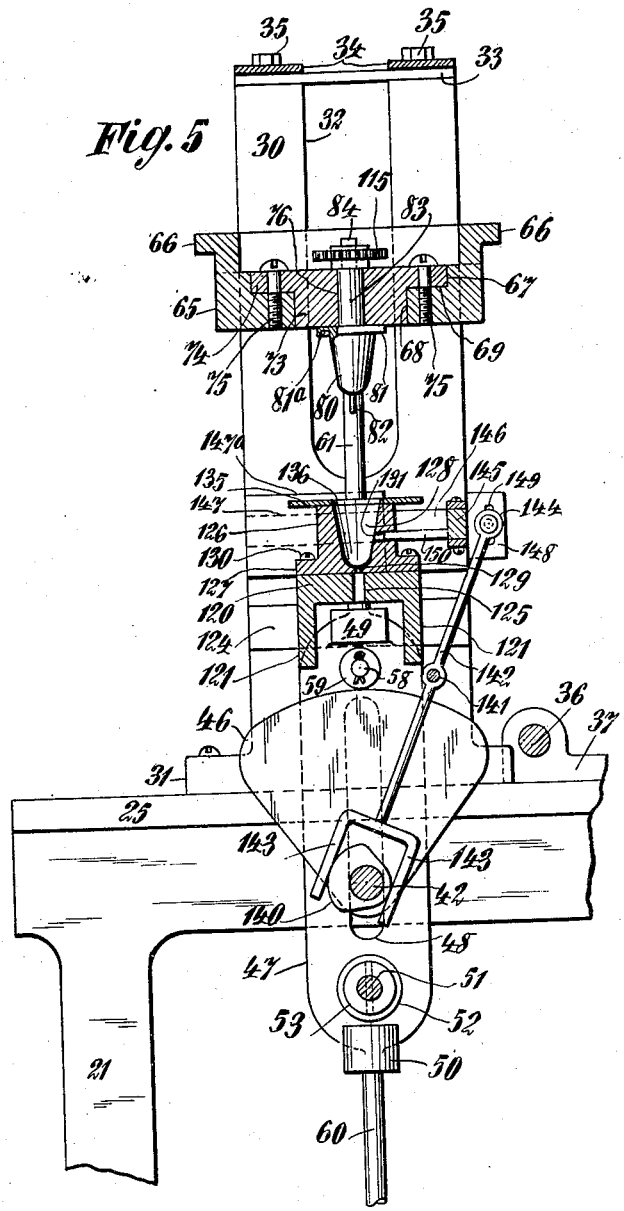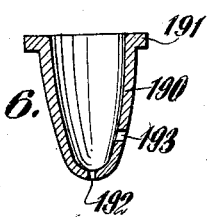

Patented Apr. 22, 1930

1,755,374

UNITED STATES PATENT OFFICE

HERMAN SONNENBERG, OF MIDDLE VILLAGE, NEW YORK

MOLDING MACHINE

Application filed August 10, 1927. Serial No. 211,996.

This invention relates to a molding machine, and is an improvement of the molding machine described in my United States Letters Patent No. 1,577,597, dated March 23rd, 1926.

The object of the invention is the production of a molding machine in which the inner bowl of a pipe or other objects can be easily and quickly molded.

The organization of the invention comprises a bottom stationary mold, which coacts with reciprocating rotating plungers to form the objects to be produced.

In the accompanying drawings Fig. 1 represents a front elevation of one form of the molding machine; Fig. 2 shows a left hand side view of Fig. 1; Fig. 3 is a top view of Fig. 1; Fig. 4 indicates an enlarged fragmentary section of Fig. 3 on the line 4, 4; Fig. 5 indicates an enlarged section of Fig. 1 on the line 5, 5; Fig. 6 indicates an enlarged section of the inner bowl of a pipe.

Referring to Figs. 1 to 5 inclusive the molding machine is indicated in this instance to comprise the similar legs 20, 21 each with the feet 22. A platform 25 is supported upon and fastened to said legs. A pair of angle shaped braces 26 connect the legs 20 and 21. A bar 27 having the guide openings 28 extends between and is connected to the legs 20 and 21. A pair of guide frames 30 each with the bottom flange 31 and the guide opening 32 are supported upon and fastened to the platform 25. A plate 33 is located upon the top end of each of the frames 30, and a pair of connecting braces 34 have their ends supported upon the plates 33, and bolts 35 secure said plates and braces to the top ends of the frames 30.

A main shaft 36 is journaled in the journal bearings 37, which latter are bolted to the top face of the platform 25. A pair of pinions 38 are fastened to the shaft 36 adjacent to its ends. A pulley 40 for a belt not shown is fastened to one end of the shaft 36. A cam shaft 42 has its ends journaled in the upper portions of the legs 20 and 21. A pair of spur gears 43 are fastened to the cam shaft 42 and mesh with the pinions 38. A pair of cams 46 are fastened to the cam shaft 42.

A pair of reciprocating members 47 are each indicated with the elongated opening 48 and have each formed therewith the top lug 49 and the bottom lug 50. A shaft 51 extends through and is fastened to the lower portions of the members 47. A pair of rollers 52 are journaled on the shaft 51. Guide collars 53 are fastened to the shaft 51 and maintain the rollers 52 in proper position. A pair of pins 58 extend from the upper portion of each of the members 47, and have each journaled thereon the upper rollers 59. The rollers 52 and 59 coact with the cams 46 to reciprocate the members 47. To each of the lugs 50 is fastened a guide rod 60, which rods extend through the guide openings 28 in the bar 27. To each of the top lugs 49 is fastened a guide rod 61, which is threaded at its upper end for the nuts 62 and 63.

A crosshead 65 has its ends guided in the guide openings 32 of the frames 30, and has openings for the threaded ends of the guide rods 61. The crosshead 65 is clamped to the guide rods 61, by means of the nuts 62 and 63. The cross head 65 has formed therewith the flanges 66, and in the central portion thereof is formed an opening having rectangular portions 67 and 68 with the seat 69 between them. A journal bracket 70 having the journal hub 71 extends up from the flanges 66. A cross bar 72 extends through openings in the flanges 66 and is fastened to the lugs 72ª extending from the cross head 65 by the screws 72ᶜ.

In the openings having the rectangular portions 67 and 68 there is detachably located the rectangular plunger support 73, having the flanges 74, which latter are seated upon the seats 69. Screws 75 detachably fasten the plunger support 73 to the cross head 65. In the plunger support 73 are formed a plurality of journal bearings 76. Clearance openings 77 extend through the cross head 65 and said plunger support 73.

A plurality of plungers are in this instance each indicated with the tapered body portion 80, having a flange 81 at its top end with a circumferential recess 81ª in the bottom face of the flange, and a pin 82 at its lower end. A shank 83 extends from the flange 81 and a pin 84 extends from four of said shanks in this instance, and an elongated pin 85 extends from the fifth shank. A journal bracket 86 is indicated having the journal hubs 87, 88 and the foot 89. The foot 89 bears upon and is fastened to the crosshead 65 by means of the screws 90. A guide sleeve 95 is indicated with the supporting flange 96 at its lower end, which latter is also fastened to the crosshead 65. A horizontal spindle 97 is journaled in the journal hubs 71 and 88. A bevel gear 98 is fastened to one end of the spindle 97 which meshes with the bevel gear 99 fastened to the elongated pin 85. A bevel gear 100 is fastened to the other end of the spindle 97. A journal bracket 103 is fastened to the outer face of one of the guide frames 30 and has formed therein at its lower end a journal bearing 104 for the shaft 42, and has also formed therewith the journal hub 105. A vertical shaft 106 is indicated with the longitudinal key way 107, and is journaled in the guide sleeve 95 and in the journal hubs 87 and 105. A bevel gear 108 is slidably secured to the vertical shaft 106, by means of the spline 109 which engages the key way 107. The bevel gear 108 meshes with the bevel gear 100. To each of the pins 84 and 85 is fastened a spur gear 115. The latter gears are in mesh to constitute a train of gears. To the lower end of the vertical shaft 106 is fastened the bevel pinion 116, which meshes with the bevel gear 117 fastened to the shaft 42.

A detachable table is indicated with the platform 120 having the depending flanges 121 and the extensions 122. The said extensions enter openings 123 in the frames 30 and are locked in said openings by means of the tapered wedge blocks 124. An elongated opening 125 is formed in the platform 120. A stationary mold 126 has formed at its lower end the flanges 127 and is provided with the cavities 128, which extend from its upper face and are axially in line with the plungers 80. An opening 129 extends from the lower end of each cavity 128 through said bottom mold. Screws 130 fasten the bottom mold 126 to the platform 120. Guide openings 131 extend from one face of the bottom mold to its cavities and at right angles thereto. A stripper plate 135 having a plurality of openings 136 is detachably located upon the top face of the bottom mold 126. A pair of dowel pins 137 extend up from the bottom mold 126 through openings in said stripper plate, and are adapted to enter the clearance openings 77. On the cam shaft 42 are fastened a pair of supplemental cams 140. A bar 141 has its ends fastened to the frames 30. A pair of levers 142 have each formed therewith the bifurcated lower end having the prongs 143, and at the upper end of each is formed an eye 144. The said levers are hinged to the bar 141, and the prongs 143 engage the supplemental cams 140. A U shaped crosshead is indicated with the longitudinal member 145 and the side members 146. The latter are guided in guide ways 147 formed in the inner faces of the frames 30. Cover plates 147ª fasten to the frames 30 over the guide ways 147, maintain the members 146 in proper position. A pair of brackets each having the wings 148 with the elongated openings 149 are fastened to the longitudinal member 145. A plurality of pins 150 extend from the said member 145 and are guided in the guide openings 131.

Referring to Fig. 6 the inner bowl, of clay, of a pipe is indicated with the body portion 190 having the flange 191 at its upper end. An opening 192 extends through the bottom and an opening 193 extends through its side wall.

To the leg 20 are fastened the three brackets 200, 201 and 202. A pin 203 preferably rectangular in cross section is guided in the brackets 200 and 201. A spring 204 encircles the pin 203 and has one end fastened thereto. To the other end of the spring is fastened the collar 205. A screw 208 is in threaded engagement with the bracket 202 and has fastened thereto the operating wheel 209.

To use the molding machine, and referring to Figs. 1 to 5 inclusive and Fig. 6, the clay or other material used to produce the objects to be molded, in this specific instance, inner bowls of pipes, is inserted in the cavities of the bottom mold 126. The pulley 40 is turned, by means of a belt not shown, and thereby through the shaft 36, the pinions 38 are turned. The spur gears 43 turn with the pinions 38, whereby the cam shaft 42 is turned. The cams 46 revolve with the rotations of the shaft 42, and thereby through the coaction of the rollers 52 and 59, the members 47 are reciprocated and whereby the cross head 65 is lowered and the plungers having the body portions 80 enter the cavities 128 and the clay or other material is shaped to the proper form, for the inner bowl 190 with the opening 192 through its bottom and the flange 191 at its top end.

With the rotations of the shaft 42 rotation is transmitted to the vertical shaft 106 through the bevel gear 117 and bevel pinion 116. The bevel gears 108 and 100 transmit rotation from the vertical shaft 106 to the horizontal spindle 97. The latter through the bevel gears 98 and 99 transmit rotation to the elongated pin 85 and thereby the spur gears 115 are turned. By this means all the plungers having the body portions 80 are turned while they are moving vertically.

During the rotations of the shaft 42 the supplemental cams 140 revolve, whereby the levers 142 are swung, which reciprocate the pins 150 and form the openings 193 in the pipe bowls having the body portions 190. Next the stripper plate 135, when the cross head 65 is in its elevated position is removed from the bottom mold 126 and thereby the bowls having the body portions 190 are removed from said bottom mold.

It will be noted that when the cross head 65 rises or lowers that the bevel gear 108 slides on the vertical shaft 106, while rotation is transmitted from said shaft to the bevel gear 108 through the spline 109.

When it is desired to maintain the movable parts of the machine in stationary position, for inspection or repairs, the operating hand wheel 209 is turned, to abut the end of the screw 208 against the accompanying end of the pin 203. The latter can thereby be forced into one of the spaces between the teeth of the spur gear 43, locking the latter to prevent its rotation.

It is to be noted that the pins 150 may be made short enough to only make an indentation on the outer face of the body portion of the object molded. The pins 150 may be made of various forms, sizes and shapes. Also instead of having only one side of the mold indicated in Fig. 5 provided with the pins 150, both sides may be provided with a second pair of the levers 142 and their appurtenances.

Various modifications may be made in the invention and the present exemplification is to be taken as illustrative and not limitative thereof.

Having described my invention what I desire to secure by Letters Patent and claim is:

1. In a molding machine the combination of a mold having a plurality of cavities, a crosshead guided in the machine, means to reciprocate the crosshead, a stripper plate detachably supported on the mold, and a plurality of plungers depending from the crosshead, each plunger having a flange at its top end, each of said flanges having a circumferential recess in its bottom face, each of said plungers disposed with its longitudinal axis coincident with the longitudinal axis of one of the cavities in the mold.

2. In a molding machine the combination of a bottom mold having a plurality of cavities, a shaft adapted to rotate journaled in the machine, a crosshead slidably guided in the machine, means interposed between the crosshead and shaft to reciprocate the crosshead during the rotation of said shaft, a plurality of plungers journaled in the crosshead and means interposed between said plungers and said shaft to rotate the plungers during the rotation of said shaft.

3. In a molding machine the combination of a mold having a plurality of cavities, a shaft journaled in the machine, means to rotate the shaft, a crosshead slidably guided in the machine, means interposed between the crosshead and shaft to reciprocate the crosshead during the rotation of the shaft, a plurality of plungers journaled in the crosshead, each coacting with one of said cavities, a gear fastened to each plunger, said gears in mesh with one another to constitute a train of gears, a vertical shaft journaled in said crosshead and in slidable relation thereto, a gear fastened to one end of said vertical shaft, a gear fastened to the first shaft in mesh with the gear on the vertical shaft, a second gear slidably connected to the vertical shaft and turning with the rotation of said vertical shaft, a horizontal spindle journaled over the crosshead and moving therewith, a gear fastened to one end of said spindle in mesh with the gear slidably connected to the vertical shaft, and gears interposed between said spindle and one of said plungers.

4. In a molding machine the combination of a mold having a plurality of cavities, said mold having guide openings extending from one of its faces to its cavities, a cam shaft journaled in the machine, a crosshead slidably guided in the machine, means interposed between said crosshead and cam shaft to reciprocate the crosshead during the rotation of said cam shaft, a cam fastened to said cam shaft, a lever hinged in the machine having one end in engagement with said cam, a second crosshead slidably guided in the machine in connection with the other end of said lever, and pins extending from said second crosshead extending into the guide openings of said mold.

5. In a molding machine the combination of a mold having a plurality of cavities, said mold having guide openings extending from one of its faces to said cavities, a cam shaft journaled in the machine, means to rotate the cam shaft, a crosshead slidably guided in the machine, plungers extending from the crosshead adapted to enter said cavities, means interposed between the cam shaft and crosshead to reciprocate the latter during the rotation of the shaft, a pair of cams fastened to the shaft, a pair of levers hinged in the machine, each lever having a pair of prongs engaging one of said cams, a second crosshead slidably guided in the machine, connecting means between the second crosshead and said levers and pins extending from said second crosshead guided in said guide openings in said mold.

In testimony whereof I affix my signature.

HERMAN SONNENBERG.